United States Patent
Grobe et al.

(10) Patent No.: US 8,798,469 B2
(45) Date of Patent: Aug. 5, 2014

(54) OPTICAL NETWORK ELEMENT AND OPTICAL TRANSMISSION SYSTEM

(75) Inventors: Klaus Grobe, Planegg (DE); Andreas Faerbert, Munich (DE)

(73) Assignee: Adva Optical Networking SE (DE)

(*) Notice: Subject to any disclaimer, the term of this patent is extended or adjusted under 35 U.S.C. 154(b) by 264 days.

(21) Appl. No.: 13/036,380

(22) Filed: Feb. 28, 2011

(65) Prior Publication Data
US 2011/0243559 A1 Oct. 6, 2011

(30) Foreign Application Priority Data

Apr. 3, 2010 (EP) .................................. 10003683

(51) Int. Cl.
*H04J 14/00* (2006.01)
(52) U.S. Cl.
USPC .................................. 398/70; 398/72; 398/79
(58) Field of Classification Search
USPC ................................................ 398/58–73, 79
See application file for complete search history.

(56) References Cited

U.S. PATENT DOCUMENTS

| | | | | |
|---|---|---|---|---|
| 8,238,751 | B1* | 8/2012 | Iannone et al. | 398/82 |
| 2002/0051267 | A1* | 5/2002 | Nakamura et al. | 359/134 |
| 2002/0191898 | A1* | 12/2002 | Evans et al. | 385/24 |
| 2004/0075891 | A1* | 4/2004 | Hwang et al. | 359/341.5 |
| 2004/0252999 | A1* | 12/2004 | Onaka et al. | 398/177 |
| 2006/0082866 | A1 | 4/2006 | Takahashi et al. | |
| 2007/0014574 | A1 | 1/2007 | Yada | |
| 2008/0019693 | A1* | 1/2008 | Sorin | 398/71 |
| 2008/0089684 | A1 | 4/2008 | Smith et al. | |
| 2009/0324230 | A1 | 12/2009 | Kashima | |
| 2010/0046949 | A1* | 2/2010 | Bainbridge et al. | 398/79 |
| 2010/0316382 | A1* | 12/2010 | Litvin | 398/79 |
| 2011/0188859 | A1* | 8/2011 | Wen et al. | 398/79 |

FOREIGN PATENT DOCUMENTS

| | | |
|---|---|---|
| WO | 2007123361 A1 | 11/2007 |
| WO | 2009123572 A1 | 10/2009 |

OTHER PUBLICATIONS

Aida K et al.: "Design and Performance of a Long-Span IM/DD Optical Transmission System Using Remotely Pumped Optical Amplifiers" XP000148979, IEE Proceedings, Aug. 1, 1990, pp. 225-229, vol. 137, No. 4, J. Optoelectronics Institution of Electrical Engineers Stevenage, GB.

* cited by examiner

*Primary Examiner* — Dzung Tran
(74) *Attorney, Agent, or Firm* — Donald R. Boys; Central Coast Patent Agency, Inc

(57) ABSTRACT

The invention relates to an optical network element (100; 200), particularly an optical line terminal, OLT, for transmitting (540) and receiving (560) signals wire an optical network that comprises at least one optical fiber link (500) and at least one further optical network element (300; 400). The optical network element (100; 200) provides a primary optical pumping mean (166; 266) for emitting optical pump power to set at least one optical fiber link (500). The emitted optical pump power forms at least one gain medium outside the optical network element (100; 200) to provide optical pump power to the network for amplifying the singles to receive (560) so that outside of the domain of the optical network element (100) no electrical energy supply is needed.

13 Claims, 5 Drawing Sheets

OPTICAL NETWORK ELEMENT AND OPTICAL TRANSMISSION SYSTEM

CROSS-REFERENCE TO RELATED DOCUMENTS

The present application claims priority to EP application 10003683.9, filed Apr. 3, 2010, which is incorporated herein in its entirety, at least by reference.

The invention relates to an optical network element, particularly optical line terminal, OLT, for transmitting and/or receiving data via at least one optical fiber link.

The invention further relates to an optical transmission system which comprises an optical network element and at least one optical fiber link.

Optical network elements and optical transmission systems of the aforementioned type are generally used for WDM (wavelength division multiplexing) network implementations, where data is transmitted via a basically passive optical network, PON, employing wavelength division multiplex techniques for increasing the transmission bandwidth that is available per optical fiber link.

It is an object of the present invention to improve an optical network element and an optical transmission system in order to enable scalability of the optical network regarding network size, network cost, transmission capacity, high optical output power and therefore a high optical span budget.

According to the present invention, regarding the above-mentioned optical network element, this object is achieved by an optical network element according to claim 1.

The inventive primary optical pumping means advantageously enable the inventive optical network element to provide optical pump power to the optical fiber link and/or to remote network nodes without requiring an active amplification and/or other pumping means at a further network element. In this context, active amplification is referred to when the respective device is supplied with energy except optical energy, i.e. electrical energy. This implies that only the inventive optical network element has to be supplied with electrical energy to operate the active amplifying means. Further network elements connected to the inventive optical network elements advantageously don't need an energy supply for pumping and/or amplifying purposes, since optical amplification and provisioning of pump power is provided for by the inventive optical network element.

According to an embodiment, an optical amplification external to the inventive optical network element is achieved by means of a gain medium which is supplied only with the optical energy provided by the inventive optical element. The inventive optical network element is ideally suited for operation with passive optical networks, PONs.

According to a further advantageous embodiment of the optical network element, the primary optical pumping means comprise a plurality of pump light sources, wherein at least two of said pump light sources provide optical pump power at different wavelengths.

Since a passive gain medium like an optical fiber having a distributed or lumped Raman amplifier can exhibit large wavelength ranges wherein optical amplification can be effected, different excitation through optical pump power received by the gain medium at different wavelengths permits optical amplification in large ranges of the optical spectrum. Thus, by providing several pump light sources emitting different wavelengths in the form of the primary optical pumping means within the optical network element, Raman amplifier(s) of the optical fiber connected to said optical network element, i.e. via the optical fiber, may be supplied and employed for broadband optical amplification. E.g., by providing several Raman amplifiers and pump light at several wavelengths of, for example 1180 nm (nanometer), 1240 nm, 1320 nm, 1360 nm, 1400 nm, 1500 nm, it is possible to cover a wavelength range of about 400 nm. Such amplification technique may e.g. be employed to amplify numerous coarse wavelength division multiplexing, CWDM, channels of said optical link.

According to a further advantageous embodiment of the optical network element, said inventive optical network element comprises secondary pumping means for supplying optical pump power to an optical amplifier or gain medium, respectively, which can e.g. be located at a further optical network element such as an optical network unit, ONU, which is connected to the inventive OLT by said optical fiber link. The secondary pumping means therefore augment the wavelength range for amplification even more, and ONUs with reduced complexity may be employed since they are not required to comprise optical pumping means. It is rather sufficient to provide an optical gain medium such as a Erbium-doped fiber at the ONU which may employ the pump power supplied by the secondary pumping means of the inventive OLT.

According to a further advantageous embodiment of the optical network element, which according to a preferred variant represents an OLT, the primary pumping means and/or the secondary pumping means are integrated into the inventive network element, i.e. OLT.

The integration of at least one of the pumping means into the inventive network element allows precise adjustments of the pumping means related to other components of the inventive network element. Moreover the installation of the inventive optical network element becomes very easy.

According to a further advantageous embodiment of the optical network element, receiving means are provided which are configured to receive coarse wavelength division multiplexing, CWDM, signals and/or dense wavelength division multiplexing, DWDM, signals from said optical fiber link.

By allowing a reception of CWDM and/or DWDM signals the inventive optical network element allows the adaption to existing network environments therefore reducing costs for otherwise necessary equipment. Moreover, in combination with the above explained amplification techniques, particularly advantageous optical transmission system offering a high span budget though using low-cost ONUs having no local pump sources can be realized.

According to a further advantageous embodiment of the optical network element, transmitting means are provided which are configured to transmit dense wave division multiplexing, DWDM signals and/or coarse wave division multiplexing, CWDM, signals to said optical fiber link.

By allowing a transmission of CWDM and/or DWDM signals the inventive optical network element allows the adaption to existing network environments therefore reducing costs for otherwise necessary equipment.

According to a further advantageous embodiment of the optical network element, said receiving means and/or said transmitting means are configured to receive or transmit, respectively, signals in the optical C-band and/or optical L-band. The use of the standard optical C-band and/or optical L-band allows the inventive optical network element to communicate with standard equipment.

According to a further advantageous embodiment of the optical network element, the inventive optical network element comprises optical amplifying means for optically amplifying at least one signal received via said optical fiber link and/or optically amplifying at least one signal to be transmitted via said optical fiber link.

An amplification of a signal to be transmitted yet inside the inventive optical network element has the advantage that a gain medium outside the inventive optical network element can amplify a signal that still exhibits a high level of optical power. The same applies for signals to receive. An amplification of a signal to receive also inside the inventive network element has the advantage that a gain medium outside the inventive optical network element must amplify a signal only that way, that it offers sufficient signal quality to be amplified inside the inventive network element. Again, these inventive measures have a positive effect on the overall span budget.

According to a further advantageous embodiment of the optical network element, at least two pump light sources of the optical network element are configured to emit optical pump power at different wavelengths to the optical fiber link so that the signals transmitted or the signals to be received may be amplified by means of Raman amplification and/or by means of EDFAs.

The former feature allows the inventive optical network element to combine gain characteristics of different amplifying means or gain mediums. Therefore the gain characteristics can be arranged that way that they overlap. This overlapping allows amplification by different mechanisms.

A further solution to the object of the present invention is given by an optical transmission system as defined by claim 9. Said optical transmission system comprises an optical fiber link and at least one optical network element according to the embodiments.

According to an embodiment, said optical fiber link comprises optical amplification means such as distributed or lumped Raman amplifiers or EDFAs configured to optically amplify optical signals travelling through said fiber link. Said optical amplification means can advantageously be supplied with optical pump power by said optical network element and its primary and/or secondary pump light sources.

According to a further advantageous embodiment, a further network element, e.g. a ONU, is connected to said fiber link. It is also possible to connect more than one further network element to said inventive network element, such as e.g. a complete PON.

According to a further advantageous embodiment, said optical amplification means of the optical fiber link comprise at least one Raman amplifier, and said primary optical pumping means are configured to provide optical pump power for said at least one Raman amplifier of said optical amplification means.

According to a further advantageous embodiment, said further network element comprises optical amplification means, particularly an EDFA, and said secondary optical pumping means are configured to provide optical pump power for said optical amplification means of said further network element.

A particularly preferred further embodiment of the optical transmission system proposes that said further network element comprises no local optical pumping means, whereby, from an OLT perspective, a near-end only optical amplification is effected.

Further features, aspects and advantages of the present invention are presented in the following detailed description with reference to the drawings in which:

FIG. 1 depicts a schematic block diagram of a first embodiment of the inventive network element 100 which is configured to comprise the functionality of an optical line terminal, OLT, that may e.g. be located at a network operator's central office.

Figure 1:
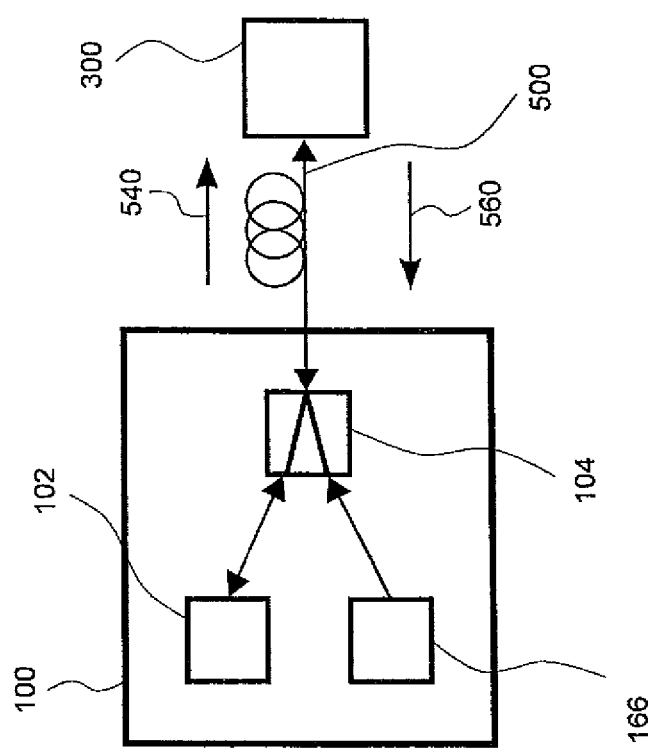
FIG. 1 depicts a schematic block diagram of an inventive network element according to one embodiment.

The OLT 100 can be connected to a passive optical network, PON, which comprises in its present and exemplary minimal configuration an optical fiber link 500 and a further network element 300 as depicted by FIG. 1. The further network element 300 may constitute an ONU.

The optical fiber link 500 interconnects the OLT 100 and the ONU 300. Preferably, the optical fiber link 500 is of the single fiber working, SFW, type. That means that only one single optical fiber is required to establish a bi-directional optical signal transmission between OLT 100 and ONU 300. Thus, signals can be transmitted from the OLT 100 to the ONU 300 over the optical fiber link 500 in a downstream direction 540, whereas signals can be transmitted from the ONU 300 to the OLT 100 over the optical fiber link 500 in an upstream direction 560. Therefore, the signals travelling in the downstream direction 540 are referred to as downstream signals. The signals travelling in the upstream direction 560 are referred to as upstream signals.

The OLT 100 comprises a transceiver 102 which is connected to the optical fiber link 500 by means of a coupler 104 that enables said transceiver 102 to transmit signals to the ONU 300 and to receive signals from the ONU 300.

Primary pumping means 166 are also connected to the coupler 104, whereby optical pump power generated by the pumping means 166 may be provided to the optical fiber link 500. The coupler 104 is configured to forward said optical pump power received from the pumping means 166 to the fiber link 500, but not to the transceiver 102.

According to a preferred embodiment, the pumping means 166 comprise one or more pump light sources which generate the optical pump power at one or more specific wavelengths, which may be identical to or different from each other.

The fiber link 500 may comprise optical amplification means (not shown) such as distributed or lumped Raman amplifiers or EDFAs. Thus, an optical amplification of upstream or downstream optical signals 540, 560 may be effected, wherein the pump light provided from the pumping means 166 is used by said optical amplification means. If e.g. downstream optical signals 540 are amplified by one or more Raman amplifiers of the optical link 500, a co-directional pumping and amplification configuration is established, because the pump light for supplying the Raman amplifier(s) with optical pump energy propagates in the same direction, i.e. downstream, as the signals 540 to be amplified.

Conversely, if upstream optical signals 560 are amplified by one or more Raman amplifiers of the optical link 500, a contra-directional pumping and amplification configuration is established, because the pump light for supplying the Raman amplifier(s) with optical pump energy propagates in the opposite direction as the upstream signals 560 to be amplified.

A combination of co-directional pumping and contra-directional pump is also possible. I.e., the pump power provided by the inventive primary pumping means 166 may be employed for pumping both optical signals originating at the OLT 100 and at the ONU 300.

Figure 2:
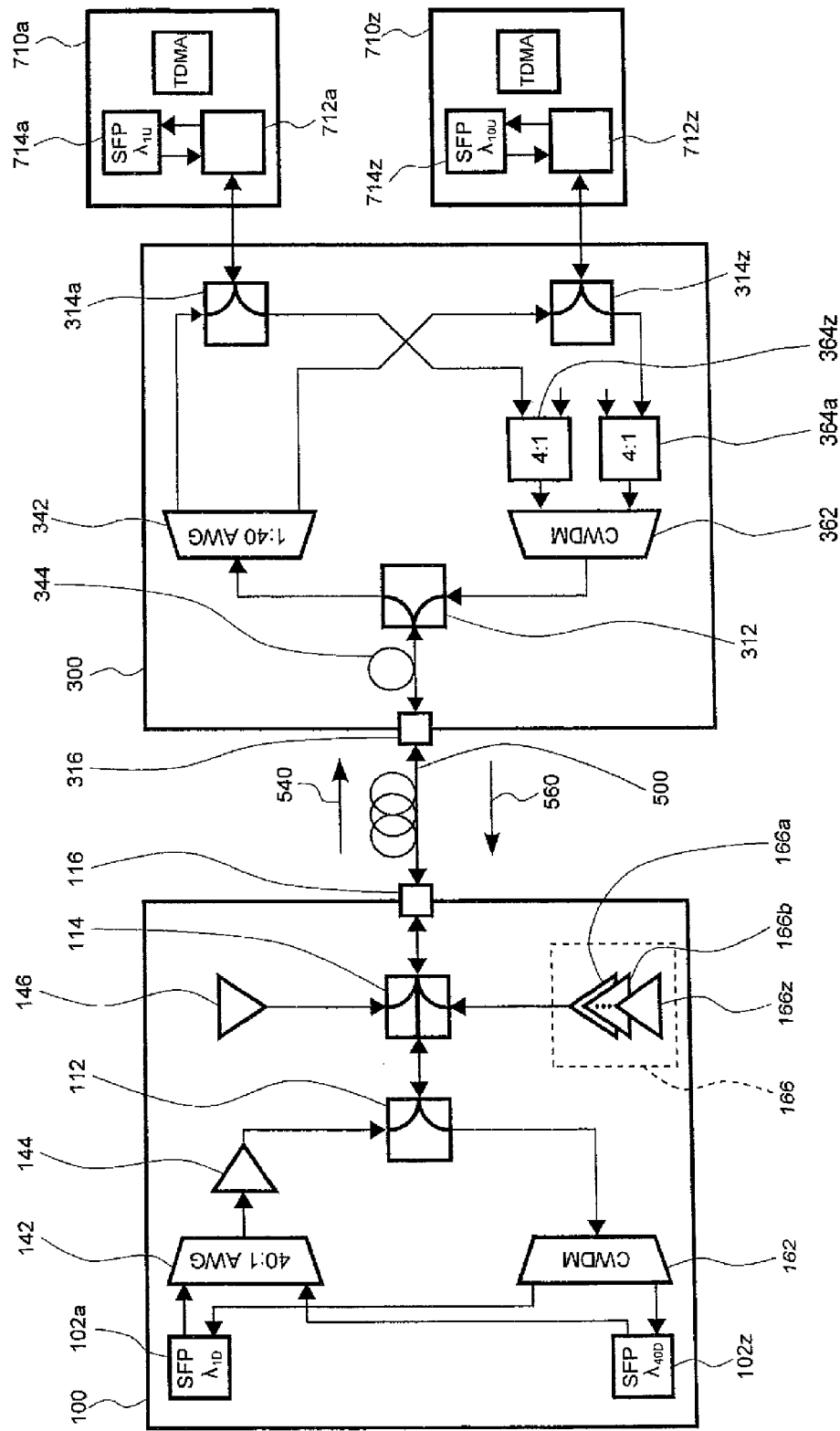
FIG. 2 depicts a schematic block diagram of a further embodiment of the inventive network element.

FIG. 2 depicts a schematic block diagram of a further embodiment of the inventive network element 100. The OLT 100 is connected through the optical fiber link 500 to a ONU 300 as already explained above with reference to FIG. 1. The ONU 300, in turn, may be connected to endpoints 710*a* and 710*z*, which may e.g. be located customer's premises. The components 100, 300, 500 form an optical transmission system with the purpose of transmitting downstream signals 540 and upstream signals 560 between the OLT 100 and the ONU 300 or the endpoints 710*a* and 710*z*, respectively.

The OLT 100 comprises electro-optical transceivers 102*a* and 102*z*. It is obvious that there can exist more than the two transceivers 102*a* and 102*z*, e.g. forty transceivers. Of course, the same applies to the endpoints 710*a* and 710*z*. The transceivers 102*a* and 102*z* are configured to transmit signals in a downstream direction 540 and to receive signals in an upstream direction 560. According to a particularly preferred embodiment, the transceivers 102*a* and 102*z* are small form factor pluggable, SFP, transceivers. Usually, the transceivers 102*a* and 102*z* transmit and receive signals on physically separated optical lines.

A multiplexer 142, for instance of the arrayed waveguide grating, AWG, type, joins the downstream signals each of which has a specific wavelength $\lambda_{1D}$, $\lambda_{40D}$ and which originates from a respective transceiver 102*a* and 102*z* on one single optical line which is attached to an optional optical amplifier 144. I.e., the amplifier 144 is supplied with a WDM signal comprising the various wavelengths $\lambda_{1D}$, $\lambda_{40D}$ generated by the transceivers 102*a*, 102*z*. The optional optical amplifier 144 may e.g. comprise an EDFA or some other type of optical amplifier known in the art. The amplifier 144 is attached to a band splitter 112.

The band splitter 112 comprises three ports and is configured to guide downstream signals from the amplifier 144 onto a single optical line which also carries the upstream signals from the ONU 300 and which is connected to a coupler 114.

The upstream signals of the ONU 300, which typically also represent a WDM signal since several distinct wavelength signals $\lambda_{1U}$, $\lambda_{10U}$ are involved, are separated from the downstream signals of the amplifier 144 by the band splitter 112 and are forwarded to a demultiplexer 162. The demultiplexer 162 separates the upstream signals coming from the ONU 300 via the link 500 and the band splitter 112 and outputs the upstream signals $\lambda_{1U}$, $\lambda_{10U}$ onto single optical lines which are associated with the various transceivers 102*a*, 102*z*. The demultiplexer 162 has the function to separate the incoming upstream signals in that manner that the separated, i.e. single wavelength, upstream signals reach the appropriate transceivers 102*a* and 102*z*.

The coupler 114 has two functions: First to interconnect the band splitter 112 and a port 116 to allow a bi-directional transmission of downstream signals and upstream signals. And secondly, to connect primary pumping means 166 and/or secondary pumping means 146 to the port 116 so as to supply the optical pump power emitted from the primary pumping means 166 and/or the secondary pumping means 146 to the optical link 500 in the downstream direction 540. The port 116 is configured to connect the OLT 100 to the optical fiber link 500.

According to a preferred embodiment, the primary pumping means 166 comprise various pump light sources 166*a*, 166*b* and 166*z*. Of course the primary pumping means 166 may comprise more or less than three pump lights sources 166*a*, 166*b* and 166*z*, each emitting optical pump power preferably at a different wavelength. Various pump light sources of same wavelength may also be employed. In analogy to the primary pumping means 166, the secondary pumping means 146 are also configured to emit optical pump power at a specific wavelength.

As already explained above, the optical fiber link 500 is attached to the port 116 of the OLT 100 and a port 316 of the ONU 300. Downstream signals from the OLT 100 are carried by the optical fiber link 500 in the downstream direction 540 to the ONU 300. Upstream signals from the ONU 300 are carried by the optical fiber link 500 in the upstream direction 560 to the OLT 100.

The ONU 300 comprises a band splitter 312 which is attached to the port 316 and which basically has the same functionality as the band splitter 112 of the OLT 100. I.e., the band splitter 312 separates the downstream signals from the upstream signals and forwards the downstream signals to a demultiplexer 342. The demultiplexer 342 separates the different downstream signals or wavelengths $\lambda_{1D}$, $\lambda_{40D}$, respectively, and forwards them to appropriate band splitters 314*a* and 314*z*.

The band splitters 314*a* and 314*z*, respectively, are attached to band splitters 712*a* and 712*z*, respectively, of the endpoints 710*a* and 710*z*. The band splitters 712*a* and 712*z* separate the signals onto physically separated optical lines which are attached to transceivers 714*a* and 714*z*. Typically, the transceivers 714*a* and 714*z* are small form factor pluggable, SFP, transceivers. The transceivers 714*a* and 714*z* are part of the endpoints 710*a* and 710*z*.

In an upstream section of the ONU 300, the band splitters 314*a* and 314*z* are attached to multiplexers 364*a* and 364*z* for concentrating, i.e. combining, the upstream signals having different upstream wavelengths $\lambda_{1U}$, $\lambda_{10U}$. The multiplexers 364*a* and 364*z*, in turn, are attached to a multiplexer 362. Of course, the ONU 300 may comprise more than two multiplexers 364*a* and 364*z*, depending on the number of end points 710*a*, 710*z*.

As can be gathered from FIG. 2, the multiplexers 364*a* and 364*z* together with the multiplexer 362 build a two-stage multiplexer cascade. The multiplexer cascade obviously can also have more than two stages. The multiplexer 362 finally combines the upstream signals on one single optical line and attaches them to the band splitter 312. The band splitter 312 guides the upstream signals $\lambda_{1U}$, $\lambda_{10U}$ onto the same optical line that also carries the downstream signals $\lambda_{1D}$, $\lambda_{40D}$.

According to an embodiment, the optical line between the port 316 and the band splitter 312 may comprise an Erbium doped fiber 344, EDF, to implement an optical amplifier of the EDFA type. Optical pump energy for the EDFA operation within the ONU 300 is supplied by the secondary pumping means 146 integrated in the OLT 100.

According to a preferred embodiment, every network element apart from the OLT 100, i.e. the optical fiber link 500, the ONU 300 and the endpoints 710*a* and 710*z*, is regarded as passive, therefore composing a passive optical network, PON to which the OLT 100 is connected. Optical pump energy for an amplification of the downstream signals and/or upstream signals is only injected in the domain of the OLT 100. Therefore, only the OLT 100 is required to be supplied with electrical energy to drive the pumping means 146, 166 that may e.g. comprise semiconductor laser sources.

According to a preferred embodiment, downstream signals in the downstream direction 540 are dense wavelength division multiplex, DWDM, signals. Especially, the transceivers 102*a* and 102*z* of the OLT 100 are configured to transmit the DWDM downstream signals. More specifically, the transceivers 102*a* and 102*z* provide distinct downstream wavelength signals $\lambda_{1D}$, $\lambda_{40D}$ which are combined by said multiplexer 142 to a DWDM signal. Likewise, the demultiplexer 342 of ONU 300 is configured to demultiplex said DWDM signal into its different downstream wavelength portions $\lambda_{1D}$, $\lambda_{40D}$ that are subsequently fed to the end points 710a, 710z.

According to a particularly preferred embodiment, the DWDM downstream signals are transmitted in an optical C-Band (about 1530 nm to about 1580 nm), wherein due to the DWDM scheme numerous single downstream channels, i.e. forty channels, may be transmitted.

The amplifier 144 of the OLT 100 amplifies the DWDM downstream signals in downstream direction 540 inside the ONU 100. According to a preferred embodiment, the amplifier 144 is configured as an EDFA-booster, which makes use of per se known EDFA type optical amplification.

By means of the optical pump power of the secondary pumping means 146 of the OLT 100, the EDF 344 inside the ONU 300 is activated for amplifying DWDM downstream signals 540 locally in the ONU 300. The EDF 344 may also be referred to as a gain medium in this case. Since the optical pump power of the secondary pumping means 146 is emitted in the downstream direction 540, co-directional optical pumping of downstream signals is effected. Advantageously, a gain profile of the EDFA 344 is ideally suited to cover the whole DWDM downstream signal wavelength range, e.g. the C-band.

According to a preferred embodiment, upstream signals in the upstream direction 560 are coarse wavelength division multiplex, CWDM, signals, i.e. their carrier wavelengths $\lambda_{1U}$, $\lambda_{10U}$ are not as close together as those of the DWDM downstream signals. For instance, neighboring carrier wavelengths for the CWDM transmission may differ by about 20 nm in contrast to the channel distance of only about 1 nm with the DWDM scheme. In order not to interfere with the DWDM downstream signal in the C-band, of course, the CWDM scheme may be so configured as not to cover the C-band.

Especially, the transceivers 714a and 714z of the endpoints 710a and 710z are configured to transmit upstream wavelength signals $\lambda_{1U}$, $\lambda_{10U}$ suitable for being combined in a CWDM-fashion by the multiplexor means 362, 364a, 364z. Likewise, the transceivers 102a and 102z of OLT 100 are configured to receive single upstream wavelength signals $\lambda_{1U}$, $\lambda_{10U}$ of the aggregated CWDM signal.

In order to provide an optical amplification of the CWDM upstream signal, the primary pumping means 166 supply optical pump power at different pump wavelengths which is employed by one or more (lumped or preferably distributed) Raman amplifiers within said link 500. Thus, the CWDM upstream signals may be amplified directly in the optical fiber link 500 by means of Raman amplification, wherein parts of or the complete optical fiber link 500 is used as a gain medium. Since in this case, the optical pump power of the primary pumping means 166 is emitted in the opposite direction as the upstream CWDM signals to be amplified, this way of providing optical pump power is referred to as contra-directional pumping.

The above described combination of DWDM downstream transmission 540 and CWDM upstream transmission 560 via an SDF type connection 500 can also be referred to as a "hybrid CWDM/DWDM-PON" and has several significant advantages:

high span budget due to (Raman-) amplification between OLT 100 and ONU 300
provisioning of optical pump sources 146, 166 at the OLT 100 only, thus enabling to employ cost-effective passive ONUs 300, which have no own pump sources,
use of low-cost CWDM SFPs at the ONUs 300.

Regarding the Raman effect, according to a further embodiment, the optical fiber link 500 is regarded as the significant gain medium and the Raman effect depends on an interaction between the associated optical pump power and the information signal through scatter processes inside the material of the optical fiber link 500. The photons of the information signal interact with the phonons of the gain medium and as an effect a photon representing the information signal with a higher energy as the triggering photon is produced. The Raman effect thus causes Raman amplification known in the art. In the present embodiment, the information signal to be amplified may e.g. be the (CWDM) upstream signal, but may also be a downstream signal. Of course, it is also possible to employ Raman amplification for DWDM signals, provided that the gain profile of such Raman amplification is compatible with, i.e. sufficiently covers, the DWDM wavelength range.

Regarding the Erbium doped fiber amplification, EDFA, effect, an Erbium doped fiber, EDF, is necessary to serve as a gain medium. The interaction between the associated optical pump power and the information signal is accomplished through the dopant ions in the gain medium. The amplification is achieved by stimulated emission, which means the transition of a stimulated labile energy level to a lower energy level.

Figure 3:
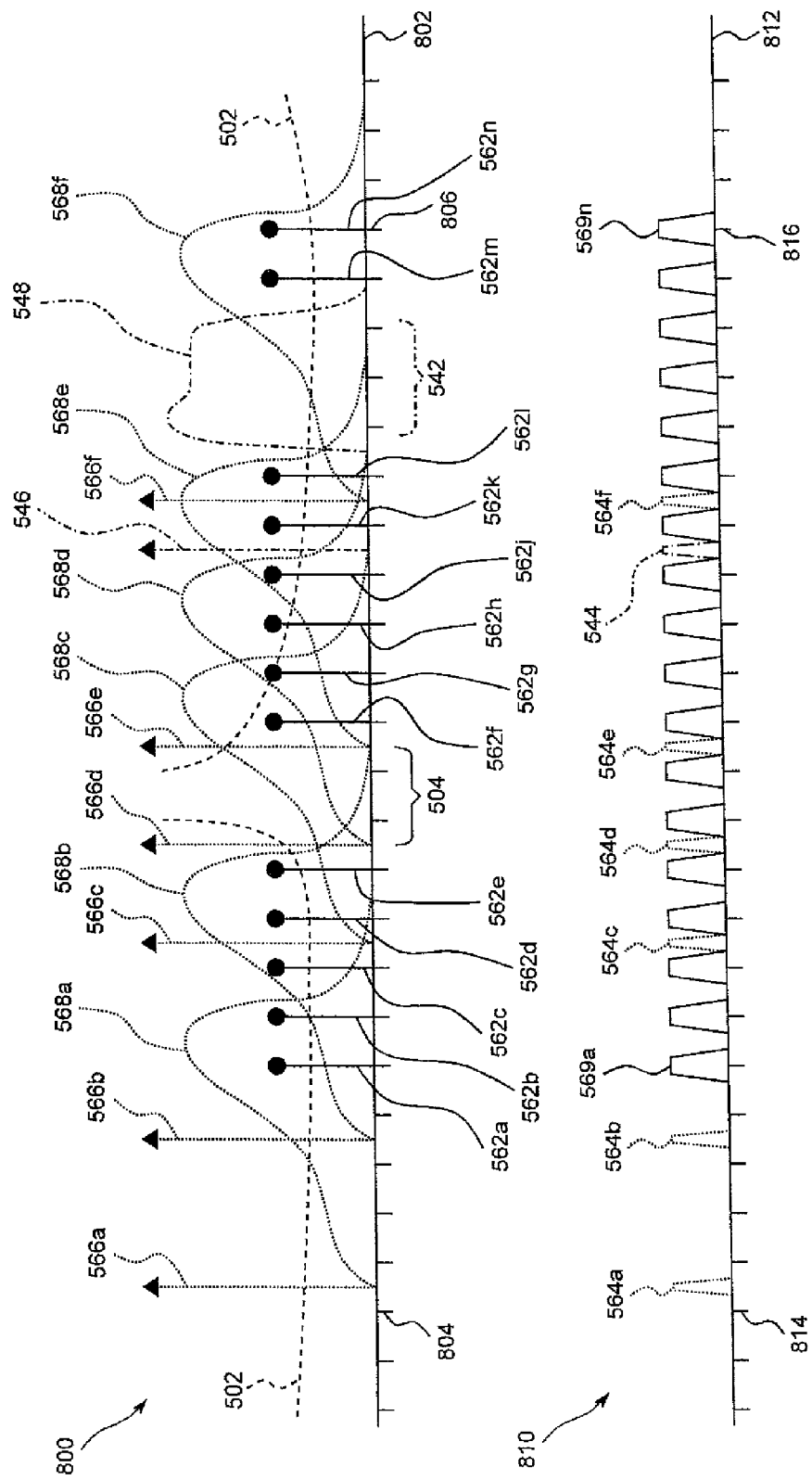
FIG. 3 depicts two schematic plots specifying the transmission and the reception of signals according to the embodiment of FIG. 2.

FIG. 3 depicts two schematic plots 800 and 810 specifying the transmission and reception of signals and related wavelength ranges as employed by the hybrid CWDM/DWDM transmission system according to the embodiment explained above with reference to FIG. 2.

The schematic plot 800 inter alia illustrates gain profiles of employed amplifying means (Raman amplifier 500, EDFA 344), wavelengths of Raman pumps 166a, 166b, 166z and the EDF pump 146 as well as wavelength ranges of DWDM downstream signals and CWDM upstream signals, whereas the schematic plot 810 is related to respective pass bands.

The schematic plot 800 comprises an axis 802 with an axis unit set to the optical wavelength in nanometers (nm). A first exemplary tick 804 denotes a wavelength of about 1170 nanometers on the axis 802. A second exemplary tick 806 denotes a wavelength of about 1610 nanometers on the axis 802.

The schematic plot 810 comprises an axis 812 with an axis unit set to the optical wavelength in nanometers. A tick 814 denotes a wavelength of about 1170 nanometers. A tick 816 denotes a wavelength of about 1610 nanometers.

As already explained above, according to a preferred embodiment, DWDM downstream signals 540 (FIG. 2) are carried in the optical C-band, cf. the wavelength range 542. The secondary pumping means 146 in FIG. 2 provide optical pump power at wavelength 546. A corresponding pass band 544 is depicted in plot 810. The optical pump power at wavelength 546 enables the EDFA 344 to optically amplify basically the whole C-band 542, cf. the respective gain characteristic 548, which covers the range 542.

An attenuation characteristic 502 in plot 800 describes the attenuation characteristic of the fiber link 500 which describes a wavelength-dependent loss in intensity of an optical signal which travels through the optical fiber link 500. The attenuation characteristic 502 is usually measured in decibel per kilometer. In a range 504 the attenuation characteristic 502 shows an abrupt rise due to the OH⁻ peak which lies inside the range 504. Because of this high attenuation caused by the optical fiber link 500 2 itself the range 504 is conventionally not used for optical signal transmission.

CWDM upstream signals transmitted in the upstream direction 560 in FIG. 2 are centered around respective upstream signal wavelengths 562a to 562n in the plot 800. The pass bands 569a to 569n corresponding to the wavelengths 562a to 562n are shown in plot 810. In general, the wavelengths 562a to 562n are equally spaced but skip the range 504 due to high attenuation and also skip the range 542 due to the transmission of the DWDM downstream signals in range 542. Other channel spacings for CWDM and DWDM schemes may also be used.

The wavelengths 566a to 566f respectively correspond to the optical pump power emitted by the pump light sources 166a, 166b and 166z of the primary pumping means 166 in FIG. 2. The plot 810 shows the corresponding pass bands 564a to 564f for the wavelengths 566a to 566f respectively. Raman gain characteristics 568a to 568f respectively emerge in the optical fiber link 500 in FIG. 2 from the optical pump power emitted at the wavelengths 566a to 566f to the Raman amplifiers integrated in the fiber 500. Advantageously, according to an embodiment, the Raman gain characteristics 568a to 568f are arranged in a way to overlap the wavelengths 562a to 562n carrying the CWDM upstream signals to enable an efficient amplification with a comparatively flat gain characteristic over the whole CWDM carrier wavelengths.

The DWDM downstream signals, carried in the optical C-band represented by range 542, are assumed to be transmitted at different carrier wavelengths with a wavelength separation in the range of 1.6 nanometers or less. The optical C-band is typically located in the range of 1530 nanometers to 1556 or even 1580 nanometers.

The CWDM upstream signals are transmitted at different wavelengths, here wavelengths 562a to 562n, with a wavelength separation typically in the range of 20 nanometers or more.

The OLT 100 according to the embodiments and an optical transmission system implemented on the basis of such OLT 100 advantageously enable to provide low-cost SFW access networks 300, 500 with a high span budget due to optical amplification between OLT 100 and ONU 300. The combined use of DWDM for downstream transmission and CWDM for upstream transmission enables to implement low-cost CWDM SFPs at the ONU side or the end user devices 710a, 710z, while CWDM broadband receivers are capable of handling DWDM transmissions as well. At the OLT side 100, DWDM capable SFPs are used. The inventive hybrid CWDM/DWDM approach can advantageously be combined with sophisticated optical amplification configurations based on pump sources 166, 146 in the OLT 100, while the ONU 300 remains passive as far as there are no pump sources required within it.

Figure 4:
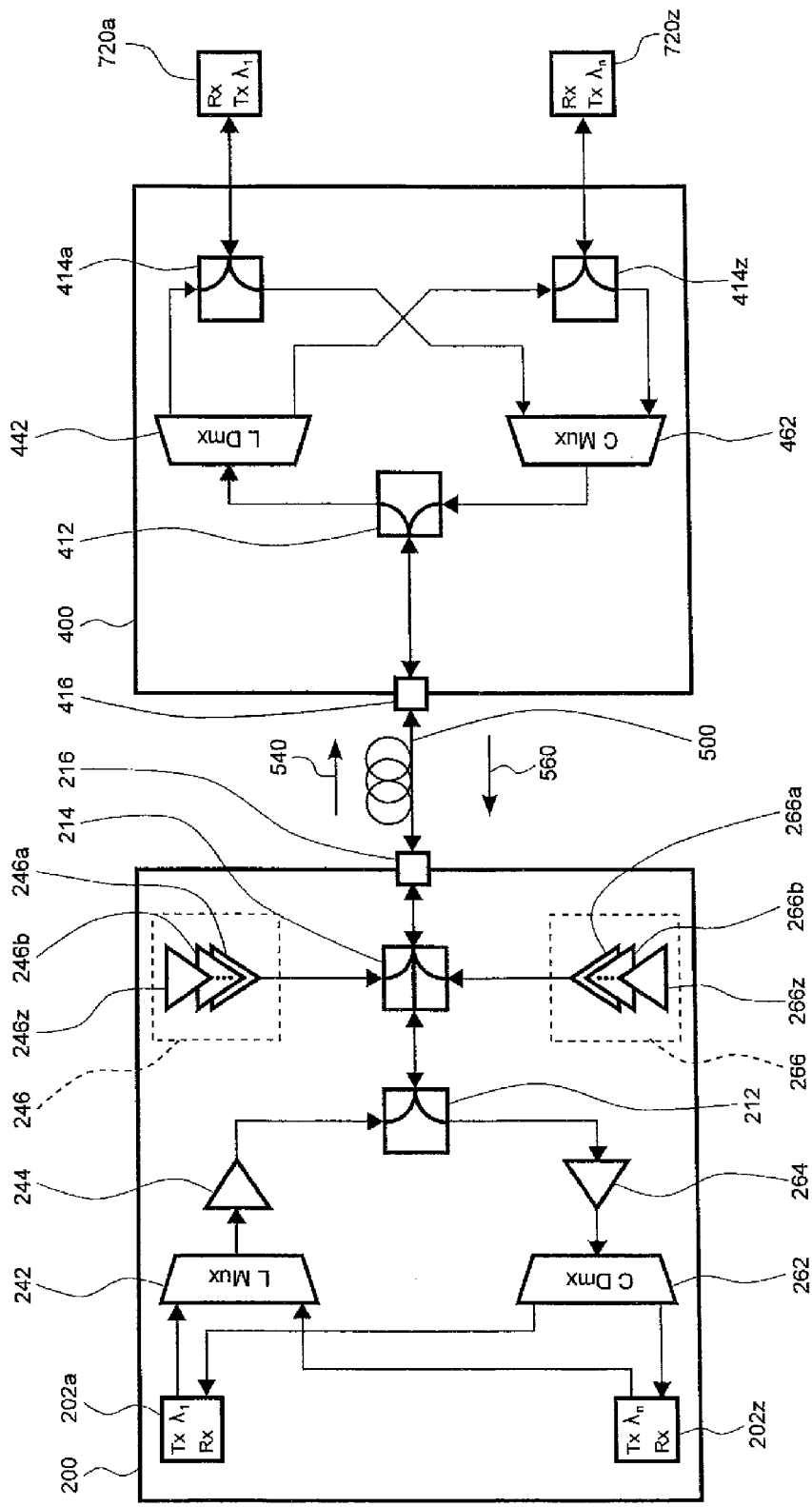
FIG. 4 depicts a schematic block diagram of a further embodiment of the inventive network element.

FIG. 4 depicts a schematic block diagram of a further embodiment of an inventive network element 200 which also realizes typical OLT functionality. The OLT 200 is connected by the optical fiber link 500 to the further network element 400, also called Remote Node, RN, for the present example. The RN 400 itself is connected to transceivers 720a and 720z. Purpose of the configuration is to transmit downstream signals and upstream signals between the OLT 200 and the transceivers 720a and 720z.

The OLT 200 comprises transceivers 202a and 202z. It is obvious that there can exist more than the two transceivers 202a and 202z. The same applies to the transceivers 720a and 720z. The transceivers 202a and 202z are configured to transmit signals in a downstream direction 540, i.e. to the RN 400, and to receive signals in an upstream direction 560, i.e. from the RN 400. Typically the transceivers 202a and 202z are small form factor pluggable, SFP, transceivers. Usually the transceivers 202a and 202z transmit and receive signals on physically separated optical lines.

Signals transmitted by the transceiver 202a or 202z are downstream signals. Signals received by the transceiver 202a or 202z are upstream signals.

A multiplexer 242 combines the downstream signals from the transceivers 202a and 202z on one single optical line which is attached to an amplifier 244. The amplifier 244 is attached to a band splitter 212.

The band splitter 212 comprises three ports. The band splitter 212 guides the downstream signals onto a single optical line which also carries the upstream signals and which is connected to a coupler 214.

The upstream signals are separated from the downstream signals by the band splitter 212. The band splitter 212 is attached to a pre-amplifier 264 which amplifies the upstream signals coming from the band splitter 212. The pre-amplifier 264 is attached to a demultiplexer 262. The demultiplexer 262 separates the WDM upstream signals coming from the pre-amplifier 264 and guides the upstream signals onto single optical lines which are attached to the transceivers 202a and 202z. The demultiplexer 262 has the function to separate the incoming upstream signal wavelengths in a manner that the separated upstream signals reach the appropriate transceivers 202a and 202z.

The coupler 214 has two functions: First to interconnect the band splitter 212 and a port 216 to allow a bi-directional transmission of downstream signals and upstream signals. And second to connect primary pumping means 266 and/or secondary pumping means 246 in a way that emitted optical pump power from the primary pumping means 266 and/or the secondary pumping means 246 is guided in the direction of the port 216 and therefore in the downstream direction 540 to the link 500.

The port 216 is configured to connect the OLT 200 to the optical fiber link 500.

The primary pumping mean 266 comprises pump light sources 266a, 266b and 266z. Of course there can exist more than the pump lights sources 266a, 266b and 266z, each emitting optical pump power at identical and/or different wavelengths.

The secondary pumping means 246 comprise pump light sources 246a, 246b and 246z. Of course there can exist more than the pump lights sources 246a, 246b and 246z, each emitting optical pump power at identical and/or different wavelengths.

The optical fiber link 500 is attached to the port 216 of the OLT 200 and a port 416 of the RN 400. Downstream signals from the OLT 200 are carried by the optical fiber link 500 in the downstream direction 540 to the RN 400. Upstream signals from the RN 400 are carried by the optical fiber link 500 in the upstream direction 560 to the OLT 200.

The RN 400 comprises a band splitter 412 which is attached to the port 416. The band splitter 412 separates the downstream signals from the upstream signals and forwards the downstream signals to a demultiplexer 442. The demultiplexer 442 separates the different downstream signal wavelengths and forwards them to band splitters 414a and 414z.

The band splitters 414a and 414z respectively are attached to the endpoints 720a and 720z.

The band splitters 414a and 414z respectively are attached to a multiplexer 462, which combines the upstream signals to one single optical line and attaches them to the band splitter 412. The band splitter 412 guides the so obtained upstream WDM signal onto the same optical line 500 carrying the downstream signals.

Every network element outside the OLT 200 including the optical fiber link 500, the RN 400 and the endpoints 720a and 720z is regarded as passive, therefore composing a passive optical network, PON. Energy for an amplification of the downstream signals and/or upstream signals is only injected in the domain of the OLT 200. Therefore only the OLT 200 is supplied which electrical energy for optical pump sources to enable optical amplification of the downstream signals and/or upstream signals.

According to the present embodiment, downstream signals in the downstream direction 540 are dense wavelength division multiplex, DWDM, signals. Especially, the transceivers 202*a* and 202*z* of the OLT 200 are configured to transmit signals suitable for DWDM downstream transmission (i.e., signals having carrier wavelengths with small inter-channel spacing of about 1 nm) and the endpoints 720*a* and 720*z* are configured to receive DWDM downstream signals or respective single wavelength channels thereof. According to the present embodiment, the DWDM downstream signals are carried in an optical L-band.

The amplifier 244 amplifies the DWDM downstream signals in downstream direction 540. The amplifier 244 is especially configured as an EDFA-Booster.

With the optical pump power of the pump light sources 246*a*, 246*b* and 246*z* of the secondary pumping means 246 of the OLT 200, the DWDM downstream signals are further amplified inside the optical fiber link 500 by means of the Raman Effect, because the fiber link 500 comprises one or more distributed or lumped integrated Raman amplifiers (not shown). The optical fiber link 500 is therefore used as a gain medium. The optical pump power of the secondary pumping means 246 is emitted in the downstream direction 540, thus enabling co-directional optical pumping for the above explained Raman amplification.

According to the present embodiment, upstream signals in the upstream direction 560 are also dense wavelength division multiplex, DWDM, signals. Especially, the endpoints 720*a* and 720*z* are configured to transmit DWDM-suitable upstream signals (having a close channel spacing of about 1 nm) and the transceivers 202*a* and 202*z* of the OLT 200 are configured to receive the DWDM upstream signals, or rather single wavelength components thereof. According to the present embodiment, the DWDM upstream signals are carried in the optical C-band.

The pre-amplifier 264 amplifies the DWDM upstream signals in upstream direction 540 inside the OLT 200. The pre-amplifier 264 is especially configured as an EDFA-pre-amplifier.

With the optical pump power of the pump light sources 266*a*, 266*b* and 266*z* of the primary pumping means 266 of the OLT 200, the DWDM upstream signals are amplified inside the optical fiber link 500 by the Raman Effect. The optical fiber link 500 is therefore used as a gain medium. The optical pump power of the primary pumping mean 266*s* is emitted in the opposite direction to the upstream direction 560, whereby this optical pump power provisioning process is referred to as contra-directional optical pumping.

The downstream signals are also referred to as transmitted signals or signals to be transmitted in relationship with the OLT 100 or 200. The upstream signals are also referred to as received signals or signals to receive in relationship with the OLT 100 or 200.

Figure 5:
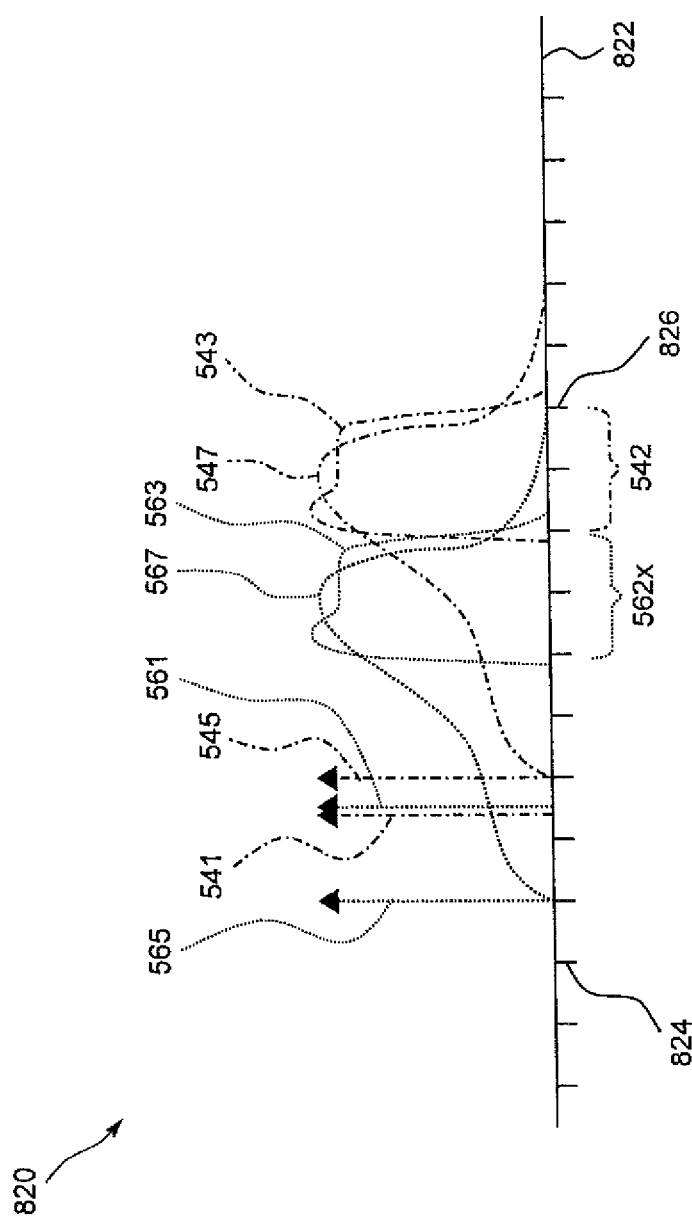
FIG. 5 depicts a schematic plot specifying the transmission and the reception of signals according to the embodiment of FIG. 4.

FIG. 5 depicts a schematic plot 820 specifying the transmission and the reception of signals by the embodiment of the inventive network element 200 according to FIG. 4.

The DWDM downstream signals in the downstream direction 540 in FIG. 4 are carried in the optical L-band represented by the range 542. To amplify the DWDM downstream signals in the downstream direction 540 in FIG. 2 an EDFA gain characteristic 543 and a Raman gain characteristic 547 are arranged to both overlap the range 542.

The wavelength 541 corresponds to the optical power emitted by the amplifier 244 in FIG. 4. This optical pump power causes the EDFA gain characteristic 543 in the optical fiber 500 in FIG. 4.

The wavelength 545 corresponds to the optical pump power emitted by one of the pump light sources 246*a*, 246*b* or 246*z* of the secondary pumping means 246 in FIG. 4. This optical pump power causes the Raman gain characteristic 547.

Because of the overlapping of the EDFA gain characteristic 543 and the Raman gain characteristic 547 the DWDM downstream signals in the downstream direction 540 in FIG. 4 are amplified in the optical L-band corresponding to the range 542 in two different ways.

The optical L-band is typically located in the range of 1565 nanometers to 1625 nanometers.

According to a preferred embodiment, the DWDM upstream signals in the upstream direction 560 in FIG. 4 are carried in the optical C-band represented by the range 562*x*. To amplify the DWDM upstream signals in the upstream direction 560 in FIG. 4 an EDFA gain characteristic 563 and a Raman gain characteristic 567 are arranged to both overlap the range 562*x*.

The wavelength 561 corresponds to the optical pump power emitted by the pre-amplifier 264 in FIG. 4. This optical pump power causes the EDFA gain characteristic 563 and the upstream signals are amplified by the pre-amplifier 264.

The wavelength 565 corresponds to the optical pump power emitted by one of the pump light sources 266*a*, 266*b* or 266*z* of the primary pumping means 266 in FIG. 4. This optical pump power causes the Raman gain characteristic 567.

Because of the overlapping of the EDFA gain characteristic 563 and the Raman gain characteristic 567 the DWDM upstream signals in the upstream direction 560 in FIG. 4 are amplified in the optical C-band corresponding to the range 562*x* in two different ways.

The implementation of the inventive optical network element 100, 200 advantageously causes no substantial self- or cross-gain modulation and also little polarization gain. Due to its amplification concept embodied by the pump light sources 166, 266, 146, 246, the inventive optical network element 100, 200 permits a better utilization of the fiber infrastructure.

Further optical network elements such as the ONU 300 or the RN 400 advantageously don't have to comprise active amplifying means such as pump light sources. Accordingly, an operator of the ONU 300, RN 400 does not have to provide amplification equipment for his components 300, 400. The existing equipment 300, 400 including the optical fiber 500 can be used at least in parts as a gain medium for use with the inventive OLT 100, 200. The gain medium is excited by optical pump power originating from the inventive optical network element 100, 200 and amplifies the passing optical signals in a passive manner. 'Passive' in the context of this description is referred to when the respective device or fiber is only supplied with optical energy by the inventive optical network element 100, 200.

Operators of the components 300, 400 obtain a cost benefit by using their existing infrastructure and low-cost equipment 300, 400 which is not required to have additional power supplies to provide pump power if it is operated together with the inventive OLT 100, 200.

The invention claimed is:

1. Optical network element, particularly optical line terminal, OLT, for transmitting signals in a downstream direction and receiving signals in an upstream direction via at least one optical fiber link, comprising:
   transceivers configured to transmit DWDM signals in the downstream direction and to receive CWDM signals in the upstream direction;
   primary optical pumping means configured to provide optical pump power in the downstream direction to said at least one optical fiber link, said primary optical pumping means configured to provide optical pump power to amplify the CWDM upstream signals in said at least one optical fiber link;
   secondary optical pumping means configured to provide optical pump power in the downstream direction to a further optical network element, said secondary optical pumping means configured to provide optical pump power to amplify the DWDM downstream signals in the further network element
   wherein said optical fiber link comprises optical amplification means which comprise a plurality of Raman amplifiers, wherein said primary optical pumping means are configured to provide optical pump power for said plurality of Raman amplifiers, and wherein Raman gain characteristics of said Raman amplifiers are arranged in a way to overlap each other and to overlap wavelengths carrying said CWDM signals.

2. Optical network element according to claim 1, characterized in that said primary optical pumping means comprise a plurality of pump light sources, wherein at least two of said pump light sources are configured to provide optical pump power at different wavelengths.

3. Optical network element according to claim 1, characterized in that said primary optical pumping means and/or said secondary optical pumping means are integrated into said optical network element.

4. Optical network element according to claim 1, characterized by receiving means configured to receive coarse wavelength division multiplexing, CWDM, signals and/or dense wavelength division multiplexing, DWDM, signals from said optical fiber link.

5. Optical network element according to claim 4, characterized in that said receiving means and/or said transmitting means are configured to receive or transmit, respectively, signals in the optical C-band and/or optical L-band.

6. Optical network element claim 1, characterized by transmitting means configured to transmit dense wave division multiplexing, DWDM, signals and/or coarse wave division multiplexing, CWDM, signals to said optical fiber link.

7. Optical network element according to claim 1, characterized by optical amplifying means for optically amplifying at least one signal received via said optical fiber link and/or optically amplifying at least one signal to be transmitted via said optical fiber link.

8. Optical transmission system comprising an optical fiber link and at least one optical network element (100; 200) according to claim 1.

9. Optical transmission system according to claim 8, characterized in that said optical fiber link comprises optical amplification means configured to optically amplify optical signals travelling through said fiber link.

10. Optical transmission system according to claim 9, wherein said optical amplification means comprise at least one Raman amplifier, and wherein said primary optical pumping means are configured to provide optical pump power for said at least one Raman amplifier of said optical amplification means.

11. Optical transmission system according to claim 8, characterized by a further network element connected to said fiber link.

12. Optical transmission system according to claim 11, wherein said further network element comprises optical amplification means, particularly an EDFA, and wherein said secondary optical pumping means are configured to provide optical pump power for said optical amplification means of said further network element.

13. Optical transmission system according to claim 8, wherein said further network element comprises no local optical pumping means.

* * * * *